June 9, 1931.  C. C. STEDMAN  1,809,573
SULKY FOR PLOWS AND THE LIKE
Filed Aug. 22, 1929   3 Sheets-Sheet 1

Inventor
C. C. Stedman
By Harry Frease
Attorney

June 9, 1931.　　　　C. C. STEDMAN　　　　1,809,573
SULKY FOR PLOWS AND THE LIKE
Filed Aug. 22, 1929　　　3 Sheets-Sheet 2

Inventor
C. C. Stedman
By Harry Frease
Attorney

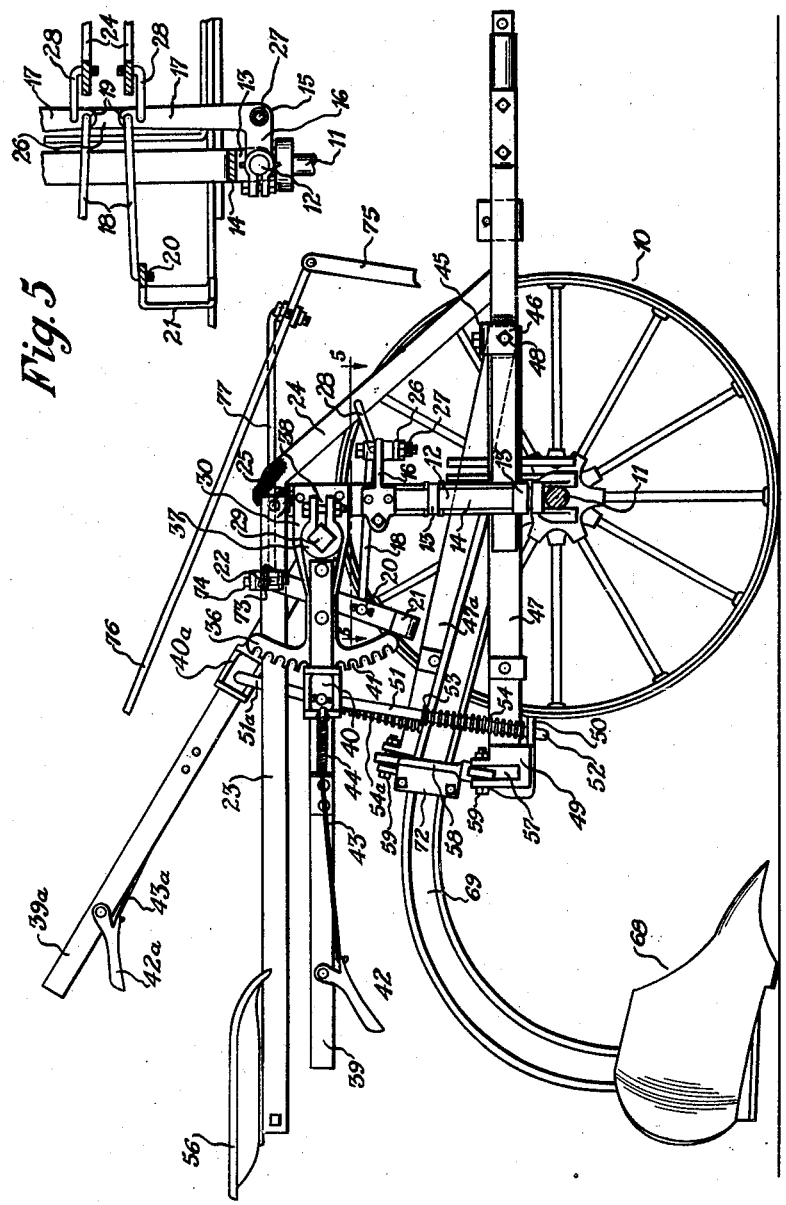

Patented June 9, 1931

1,809,573

UNITED STATES PATENT OFFICE

CHARLES C. STEDMAN, OF CLEVELAND HEIGHTS, OHIO, ASSIGNOR TO CENTAUR TRACTOR CORPORATION, OF GREENWICH, OHIO, A CORPORATION OF OHIO

SULKY FOR PLOWS AND THE LIKE

Application filed August 22, 1929. Serial No. 387,598.

The invention relates to sulkies for carrying plows and other agricultural implements and more particularly to a vehicle of this kind arranged to be connected to a tractor.

The objects of the improvement are to provide a sulky so constructed that the plow carried thereby is arranged to float; to provide means for leveling the plow so that it will be in vertical position regardless of the angle at which the sulky itself may be tilted; to provide means for regulating the depth of the plow; to provide means for setting the plow point to make a deeper or wider furrow; to provide spring balancing means to balance the weight of the plow; to provide a foot control for angling the wheels of the sulky; to provide a foot control for the tractor to which the sulky is connected; and to generally improve and simplify constructions of this kind.

Figure 1:
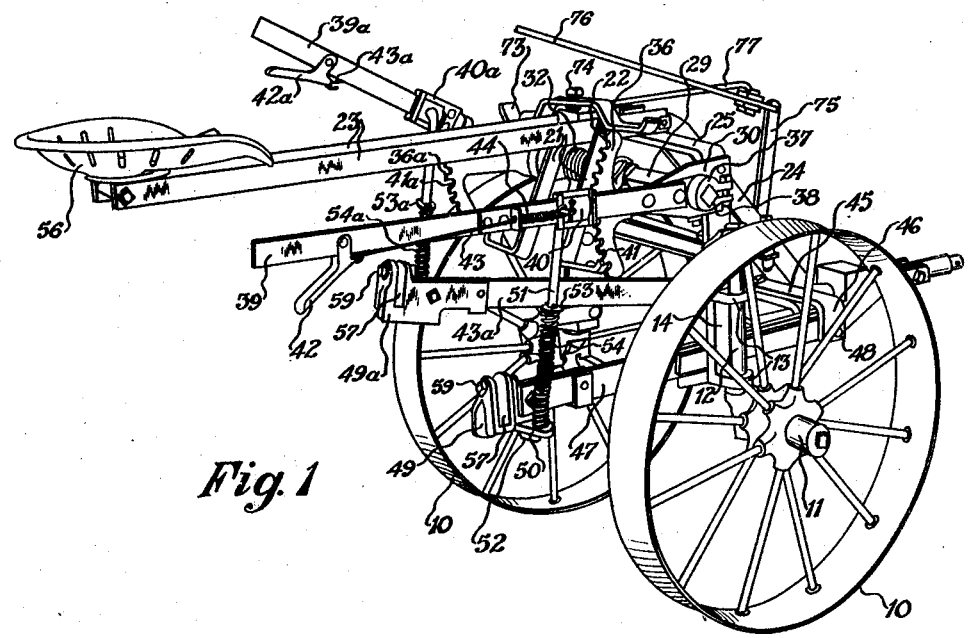
Figure 6:
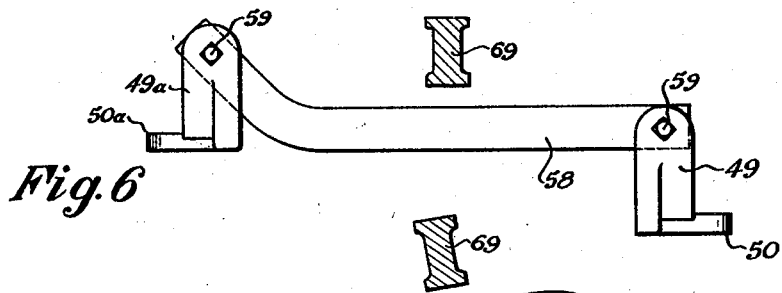
Figure 7:
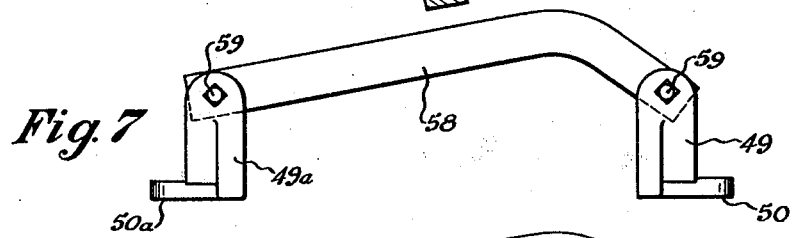
Figure 8:
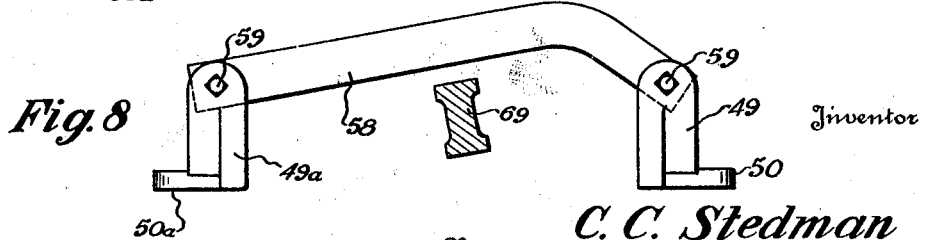
Figure 3:
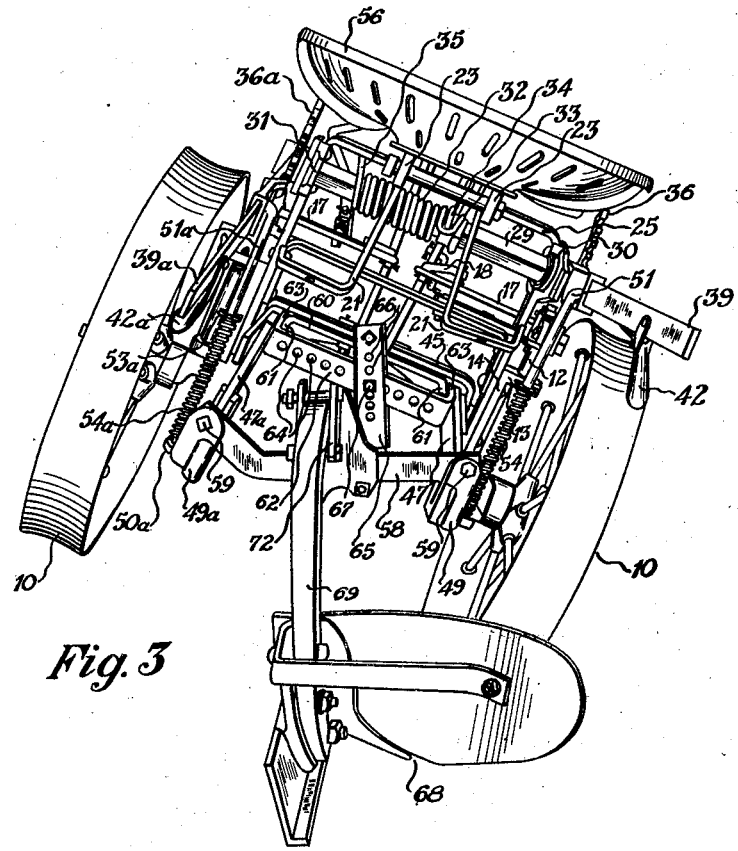
Figure 2:
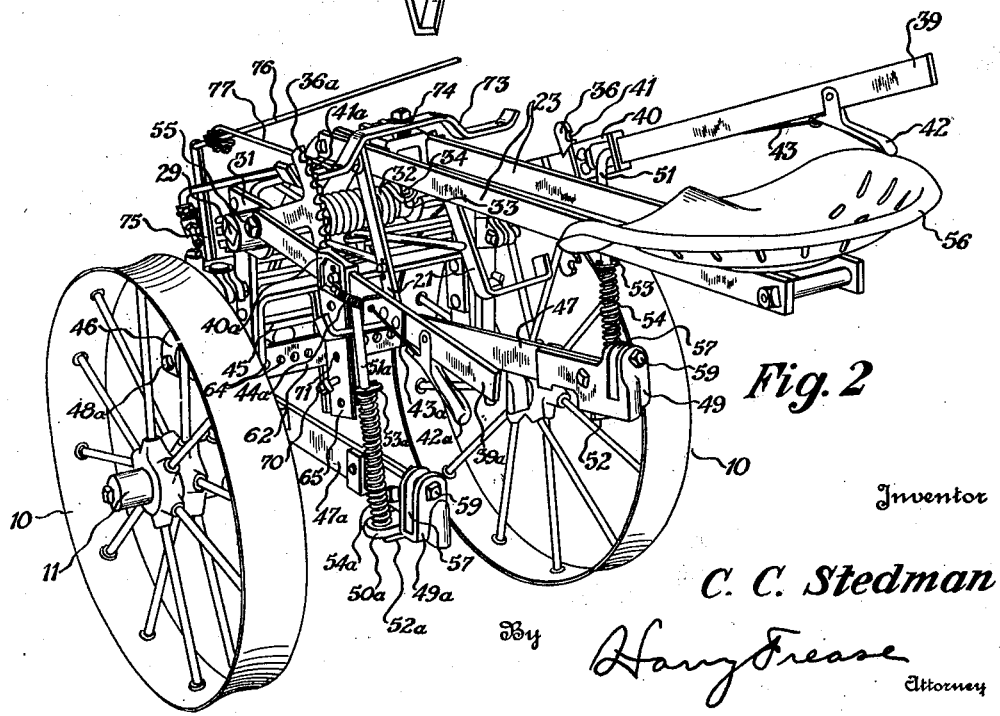

An embodiment of the invention is illustrated in the accompanying drawings, in which Figure 1 is a perspective view taken from the right-hand side of the improved sulky;

Fig. 2, a similar view taken from the left-hand side of the sulky;

Fig. 3, a perspective from the rear of the sulky showing the same tilted to the position it would assume when operating upon a hillside, the plow being adjusted to vertical position in order to cut a vertical furrow;

Fig. 4, a longitudinal sectional view through the improved sulky;

Fig. 5, a section on the line 5—5, Fig. 4;

Fig. 6, a diagrammatic view of the floating crossbar which carries the plow beam, showing the same in the regular or normal position;

Fig. 7, a similar view showing the adjustment of the crossbar for plowing in sand; and Fig. 8, a similar view showing the positions of the crossbar and plow beam for very deep plowing.

Similar numerals refer to similar parts throughout the drawings.

The sulky is mounted upon two wheels indicated at 10 arranged to travel upon the ground, each wheel being journaled upon an axle 11 having a right angular vertical portion 12 journaled in the bearings 13 formed upon or carried by the side frame members 14.

An L-shaped lever 15 is connected to the upper end of each of the vertical portions 12 of the axle as by the shorter arm 16 thereof, the longer arm 17 having a link 18 pivotally connected to its end, as at 19, the other end of the link being pivoted as at 20 to a foot lever 21.

Each of the foot levers or pedals 21 is pivoted at its upper end, as at 22, to the adjacent seat bar 23. These seat bars are fixed, at their forward ends, to the inclined frame member 24 and to the horizontal crossbar 25 of the frame, the latter being also connected at opposite ends to the vertical frame members 14.

For the purpose of angling both wheels simultaneously by the operation of either of the foot levers, a link 26 is pivoted at each end, as at 27 to the L-shaped levers 15.

In order to hold the wheels against angling for normal operation of the sulky, a detachable link 28 may be connected with each L-shaped lever 15 and with the inclined frame member 24. These links may be attached to hold the parts in the position best shown in Figs. 4 and 5, whereby the wheels will be held parallel to the longitudinal axis of the sulky.

When it is desired to use the foot levers 21 for angling the wheels, these links 28 may be detached, whereby a movement of either foot lever will, through the link 26, simultaneously angle both wheels in the same direction.

A square shaft 29 is journaled at its right and left end portions respectively in bearings 30 and 31 carried by the side frame members 14 and has a coil spring 32 located around the same, one end of the coil spring being hooked as at 33 and connected to a lug 34 on the shaft, the other end thereof being engaged with the top frame member 25, as indicated at 35.

A quadrant 36 is fixed to or formed integrally with the bearing member 30 and a split boss 37 is clamped upon the adjacent end of the square shaft, as indicated at 38, an elevating lever 39 being rigidly connected to said boss and provided with a spring pressed pawl 40, of usual construction, arranged to engage the teeth 41 of the quadrant 36, an operating handle 42 being pivoted near the free end portion of the lever 39 for releasing said pawl.

The pawl is connected to the handle 42 as by the rod 43 and a spring 44 is provided for normally urging the pawl into engagement with the teeth 41 of the quadrant 36.

The frame member 45 is located in the forward end portion of the sulky and provided with the depending ends 46. The supporting lever 47 is pivoted at its forward end as at 48 to one of said depending ends and is provided at its free or rearward end with the drawbar bracket 49.

An ear 50 is formed upon said bracket and the rod 51, which is supported from the lever 39, is slidably located through said ear, the lower end thereof being turned at an angle as at 52 to support the weight of the lever 47 upon said rod.

A collar 53 is fixed upon the rod 51 at a point spaced above the ear 50 and a coil spring 54 is located around the rod and interposed between the collar and ear, tending to normally urge the lever 47 downward but permitting the same to compress the spring and move upward without changing the position of the rod.

A quadrant 36a is fixed upon the other end of the square shaft 24 and a leveling lever 39a is pivoted as at 55 upon said quadrant. This lever is otherwise substantially the same as the lever 39 and is provided with the pawl 40a for engagement with the teeth 41a of the quadrant 36a, a handle 42a being pivoted upon the lever and connected to the pawl as by the rod 43a, a spring 44a being provided for normally urging the pawl into engagement with the teeth of the quadrant.

A supporting lever 47a, similar to the lever 47, is pivoted as at 48a to the other depending end 46 of the frame member 45 and provided at its rear end with a drawbar bracket 49a, similar to but reversely disposed to the bracket 49, said bracket being provided with an ear 50a through which the rod 51a, supported from the lever 39a, is slidably located, the lower end thereof being bent at an angle below the ear as at 52a.

A collar 53a is fixed midway of the ends of the rod 51a and a coil spring 54a is located around the rod between the collar and ear to normally urge the lever 47a downward while permitting the same to rise with reference to the rod.

As illustrated in Figs. 1, 2, 3 and 4, the levers 39 and 39a are at all times within easy reach of the operator from the seat 56.

Each of the brackets 49 and 49a is provided with a transverse slot 57, opening from the upper side, to receive the transverse crossbar 58, the ends of which are pivotally connected to the brackets as by bolts 59 or the like, permitting movement of the levers 47 and 47a with reference to each other.

A frame member 60 is mounted beneath the frame member 45 and provided with the downturned ends 61 to which the tool hitch 62 is connected by means of the forwardly disposed end portions 63.

This tool hitch is provided with a plurality of apertures 64 for the pivotal connection for the plow hitch angle 65 which is provided with a plurality of openings 66 to selectively receive the pivot bolt 67.

The plow indicated generally at 68 is provided with a beam 69 of usual construction, the forward end portion of which is arranged to be connected to the hitch angle 65 as by a bolt 70 arranged to be selectively located through any of the apertures 71. The beam is attached to the floating crossbar 58 as by the clamp 72.

The crossbar 58 may be connected to the brackets 49 and 49a in the position shown in Fig. 6 with the plow beam mounted above the same for ordinary or regular plowing; or the crossbar may be inverted, as shown in Figs. 7 and 8, with the plow beam mounted above the same, as in Fig. 7, for plowing in sand or the like, or below the crossbar, as in Fig. 8, for very deep plowing.

When it is desired to elevate or lower the plow, the lever 39 is raised or lowered accordingly, rotating the square shaft and through it the lever 39a, thus raising or lowering the supporting levers 47 and 47a in unison.

If it is desired to tilt the plow with reference to the sulky, in order that the plow may be held vertical when the sulky is riding on a hillside, or with one wheel in a furrow and the other on solid ground, as shown in Fig. 3, the lever 39a is raised or lowered accordingly and when the proper angle is obtained the plow may be raised or lowered by means of the lever 39.

The spring 32 counterbalances the weight of the plow and permits the same to be raised with very little effort on the part of the operator.

The plow hitch angle 65 is adjustable vertically as well as horizontally and arranged to oscillate upon its pivot in order to permit the plow point to be set in the proper position for cutting a furrow of any desired depth and width.

If it is desired to operate the control rods of the tractor, to which the sulky is attached, with the feet, a foot lever 73 may be pivoted upon the frame as at 74 in position to be reached by the operator from the seat 56, the control rods from the tractor being connected thereto in any suitable manner.

Ordinarily for the purpose of controlling the tractor a lever 75 is pivotally mounted upon the tractor and connected in any suitable manner to the gear shift, clutch or other tractor control. A control rod 76 leads from this lever upward to a point near the driver's seat where he can easily reach the same for controlling the tractor.

In order to control the tractor by foot, a link 77 is pivotally connected to the rod 76 and to the foot lever 73, whereby the tractor may be controlled either by hand or foot as occasion may require.

I claim:

1. A sulky for plows and the like including a frame, wheels upon the frame, a transverse crossbar for supporting a plow and the like, means for raising or lowering each end of the crossbar relative to the other end thereof and means for raising or lowering both ends of the crossbar simultaneously.

2. A sulky for plows and the like including a frame, wheels upon the frame, a pair of levers pivoted upon the frame, a transverse crossbar pivotally connected at its ends to the levers and arranged to support a plow and the like, means for raising and lowering each of the levers independently of the other and means for raising and lowering both of the levers simultaneously.

3. A sulky for plows and the like including a frame, wheels upon the frame, a pair of levers pivoted upon the frame, a transverse crossbar pivotally connected at its ends to the levers and arranged to support a plow and the like, a leveling lever for raising and lowering each of said levers independently of the other and an elevating lever for raising and lowering both of said levers in unison.

4. A sulky for plows and the like including a frame, wheels upon the frame, a transverse crossbar for supporting a plow and the like, a leveling lever for raising and lowering each end of the crossbar relative to the other and an elevating lever for raising and lowering both ends of the crossbar in unison.

5. A sulky for plows and the like including a frame, wheels upon the frame, a transverse crossbar for supporting a plow and the like, means for raising or lowering one end of the crossbar relative to the other end thereof, means for raising or lowering both ends of the crossbar simultaneously, the crossbar having a bend near one end, means for mounting the crossbar in reverse position and means for attaching the plow and the like above or below the crossbar.

6. A sulky for plows and the like including a frame, wheels upon the frame, a pair of levers pivoted upon the frame, a transverse crossbar pivotally connected at its ends to the levers and arranged to support a plow and the like, means for raising and lowering one of the levers independently of the other, means for raising and lowering both of the levers simultaneously, the crossbar having a bend near one end, means for mounting the crossbar in reverse position and means for attaching the plow and the like above or below the crossbar.

7. A sulky for plows and the like including a frame, wheels upon the frame, a pair of levers pivoted upon the frame, a transverse crossbar pivotally connected at its ends to the levers and arranged to support a plow and the like, a leveling lever for raising and lowering one of said levers independently of the other, an elevating lever for raising and lowering both of said levers in unison, the crossbar having a bend near one end, means for mounting the crossbar in reverse position and means for attaching the plow and the like above or below the crossbar.

8. A sulky for plows and the like including a frame, wheels upon the frame, a transverse crossbar for supporting a plow and the like, a leveling lever for raising and lowering one end of the crossbar relative to the other, an elevating lever for raising and lowering both ends of the crossbar in unison, the crossbar having a bend near one end, means for mounting the crossbar in reverse position and means for attaching the plow and the like above or below the crossbar.

9. A sulky for plows and the like including a frame, wheels upon the frame, a transverse crossbar for supporting a plow and the like, means for raising or lowering one end of the crossbar relative to the other end thereof, means for raising or lowering both ends of the crossbar simultaneously and two independent spring means permitting the crossbar to oscillate whereby the plow and the like may float to either side.

10. A sulky for plows and the like including a frame, wheels upon the frame, a transverse crossbar for supporting a plow and the like, a leveling lever for raising and lowering one end of the crossbar relative to the other, an elevating lever for raising and lowering both ends of the crossbar in unison and two independent spring means permitting the crossbar to oscillate whereby the plow and the like may float to either side.

11. A sulky for plows and the like including a frame, wheels upon the frame, a pair of levers pivoted upon the frame, a transverse crossbar pivotally connected at its ends to the levers and arranged to support a plow and the like, means for raising and lowering one of the levers independently of the other, means for raising and lowering both of the levers simultaneously and two independent spring means permitting said levers to rise whereby the plow and the like may float to either side.

12. A sulky for plows and the like including a frame, wheels upon the frame, a pair of levers pivoted upon the frame, a transverse crossbar pivotally connected at its ends to the levers and arranged to support a plow and the like, a leveling lever for raising and lowing one of said levers independently of the other, an elevating lever for raising and lowering both of said levers in unison and two independent spring means permitting said levers to rise whereby the plow and the like may float to either side.

13. A sulky for plows and the like including a frame, wheels upon the frame, a transverse crossbar for supporting a plow and the like, means for raising or lowering one end of the crossbar relative to the other end thereof, means for raising or lowering both ends of the crossbar simultaneously and two independent spring means for counterbalancing the weight of the plow and the like.

14. A sulky for plows and the like including a frame, wheels upon the frame, a transverse crossbar for supporting a plow and the like, means for raising or lowering one end of the crossbar relative to the other end thereof, means for raising or lowering both ends of the crossbar simultaneously and a hitch angle pivoted upon the frame for attachment to the end of the beam of the plow and the like.

In testimony that I claim the above, I have hereunto subscribed my name.

CHARLES C. STEDMAN.